(12) United States Patent
Herkommer

(10) Patent No.: US 7,477,438 B2
(45) Date of Patent: Jan. 13, 2009

(54) OPTICAL IMAGING SYSTEM FOR IMAGING AT LEAST TWO PLANES OF A LIGHT BEAM SPACED APART IN THE BEAM DIRECTION

(75) Inventor: Alois Herkommer, Aalen (DE)

(73) Assignee: Carl Zeiss Laser Optics GmbH, Oberkochen (DE)

( * ) Notice: Subject to any disclaimer, the term of this patent is extended or adjusted under 35 U.S.C. 154(b) by 0 days.

(21) Appl. No.: 10/441,990

(22) Filed: May 20, 2003

(65) Prior Publication Data

US 2004/0017624 A1 Jan. 29, 2004

(30) Foreign Application Priority Data

May 24, 2002 (DE) ................................. 102 23 319

(51) Int. Cl.
*G02B 26/08* (2006.01)
(52) U.S. Cl. ...................................... 359/223; 359/364
(58) Field of Classification Search ................. 359/366, 359/364, 223–226, 212, 381, 555
See application file for complete search history.

(56) References Cited

U.S. PATENT DOCUMENTS

| | | | | |
|---|---|---|---|---|
| 2,628,529 | A | * | 2/1953 | Braymer ...................... 359/366 |
| 4,260,255 | A | | 4/1981 | Wachs et al. |
| 4,707,836 | A | | 11/1987 | Travis |
| 5,621,561 | A | * | 4/1997 | Belfatto et al. .............. 359/205 |
| 5,850,307 | A | * | 12/1998 | Straayer ...................... 359/209 |
| 6,014,206 | A | | 1/2000 | Basting et al. |
| 6,061,175 | A | * | 5/2000 | Watters ....................... 359/366 |
| 6,212,013 | B1 | * | 4/2001 | Kodama et al. ............. 359/634 |
| 6,624,424 | B2 | * | 9/2003 | Eckert et al. ................ 250/372 |

FOREIGN PATENT DOCUMENTS

| | | |
|---|---|---|
| DE | 89 06 627 U | 9/1989 |
| EP | 0 172 024 | 2/1986 |
| GB | 1 531 893 | 11/1978 |
| WO | WO 01/59414 A1 | 8/2001 |

OTHER PUBLICATIONS

XP-001010849; K. Mann, J. Ohlenbusch, V. Westphal; Characterization Of Excimer Laser Beam Parameters; Jul. 7, 1996; pp. 367-377.

* cited by examiner

*Primary Examiner*—Joshua L Pritchett
(74) *Attorney, Agent, or Firm*—Harness, Dickey & Pierce, P.L.C.

(57) ABSTRACT

An optical imaging system for imaging at least two planes of a light beam spaced apart in the beam direction, in particular of a laser light beam, onto a common target site, for example a detector, has at least one optically imaging element arranged in the beam path of the light beam. The at least one optically imaging element is a collecting primary mirror, and arranged downstream of the primary mirror are at least two secondary mirrors that can be brought alternately into the beam path, the secondary mirrors being designed such that one secondary mirror permits imaging of one plane, and the other secondary mirror permits imaging of the other plane of the light beam onto the target site in each case.

22 Claims, 4 Drawing Sheets

OPTICAL IMAGING SYSTEM FOR IMAGING AT LEAST TWO PLANES OF A LIGHT BEAM SPACED APART IN THE BEAM DIRECTION

CROSS REFERENCE TO FOREIGN APPLICATION

The present application claims priority of German patent application DE 102 23 319.5 filed on May 24, 2002, which is incorporated herein by reference.

BACKGROUND OF THE INVENTION

The invention relates to an optical imaging system for imaging at least two planes of a light beam spaced apart in the beam direction, in particular a laser light beam, onto a common target site, for example a detector, comprising at least one optically imaging element arranged in the beam path of the light beam.

An optical imaging system of the type mentioned at the beginning is used, in particular, in a device for analyzing and/or adjusting a light beam, in particular a laser light beam, and/or for adjusting a laser resonator.

The present invention also relates to a device for analyzing and/or adjusting a beam, in the case of which an optical imaging system of the abovementioned type is used.

Analyzing a laser beam serves the purpose of assessing the quality and the state of adjustment of the laser by obtaining information about the intensity distribution in the laser light beam at different planes and/or sites in the light beam and/or in the laser resonator. The aim of the imaging system mentioned at the beginning is to be able to image at least two planes of a light beam spaced apart in the beam direction onto a common target site, for example a detector. The imaging system is intended in this case to be able, for example, to image the cross section of a laser beam at least two different sites in the near field of the light beam, or the cross section of the light beam at a site in the near field as well as at a site in the far field of the light beam onto the common target site. The imaging of a plane in the far field of the light beam produces information about the angular distribution or divergence of the light beam. In order to image a plane of the light beam in the far field, the light beam is usually focused in this case onto the target site, while a plane in the near field of the light beam is imaged onto the target site in a 1:1 fashion.

In the imaging system disclosed in WO 01/59414 A1, the light beam coming from the light source, that is to say a laser in the case of application described there, is firstly split by means of a beam splitter into two component beams. One component beam is imaged under near-field conditions onto the target site, and the other component beam is imaged under far-field conditions onto the same target site, a camera there. The collective lens is used in each component beam as optically imaging element.

The use of lenses as optically imaging elements has the disadvantage that because of dispersion the imaging system must be readjusted when light beams of different wavelength are to be imaged. It therefore follows in the case of this known imaging system that a readjustment of the imaging system is required in each case for analyzing different light sources that emit light of different wavelengths, the adjustment consisting, for example, in a mechanical positioning of the optically imaging elements.

Furthermore, with this known imaging system, it is necessary for the imaging system likewise to be readjusted by changes in the position of the lens, for example, when, for example, two different planes are to be imaged in the near field of the light beam onto the fixed target site.

A further optical imaging system is disclosed in document U.S. Pat. No. 6,014,206, in the case of which the same disadvantages exist as with the known imaging system previously described, because imaging or focusing lenses are also used there as imaging systems, there being a need for the imaging lens to be repositioned in order to image different planes of the light beam in the near field.

However, the adjustment of such an imaging system to adapt the system to another wavelength or to image another plane of the light beam onto the target site requires special experience on the part of the operator and is time consuming. However, since it is also to be possible to use such an imaging system in customer services, it should be possible to operate the imaging system with as little outlay as possible.

It is therefore the object of the invention to develop an optical imaging system of the type mentioned at the beginning to the effect that on the one hand it can be used for different wavelengths, and on the other hand it permits imaging of at least two planes of the light beam spaced apart in the beam direction without outlay on adjustment.

SUMMARY OF THE INVENTION

According to the invention, an optical imaging system for imaging at least two planes of a light beam spaced apart in the beam direction onto a common target site is provided, comprising:

at least one optically imaging element arranged in the beam path of said light beam, said at least one optically imaging element being a collecting primary mirror, at least two secondary mirrors being arranged downstream of said primary mirror, said at least two secondary mirrors can be brought alternately into the beam path of said laser light beam, and wherein said secondary mirrors are designed such that one of said at least two secondary mirrors permits imaging of one of said at least two planes of said light beam, and the other of said at least two secondary mirrors permits imaging of the other of said at least two planes of said light beam onto said target site, respectively.

Instead of one or more lenses, the imaging system according to the invention has as the at least one optically imaging element a collecting primary mirror that can, for example, be an uncoated or metallic mirror. The use of a mirror as optically imaging element has the advantage that imaging of the light beam is independent of wavelength. The imaging system according to the invention can therefore be applied for different wavelengths. The at least two secondary mirrors that are arranged downstream of the primary mirror and that can be brought into the beam path alternately, now have the further advantage that in order to image the at least two planes of the light beam the secondary mirror provided for imaging this plane is respectively brought into the beam path such that it is merely necessary to switch over between the imaging of the two planes with a low effort on manipulation. A respective adjustment of the imaging system according to the invention because of different wavelengths or because of imaging of different planes of the light beam is therefore not required. The effort on manipulation for the imaging system according to the invention is therefore substantially simplified. By contrast with the imaging systems known from the prior art, the optical imaging system according to the invention can even manage in principle without beam splitters, because imaging the light beam both under near-field conditions and under far-field conditions can be assigned in each case to one of the secondary mirrors. When, for example, only two secondary mirrors are present, it is possible, for example, for one secondary mirror to be designed such that it permits a plane to be imaged in the far field or the light beam to be focused onto the target site, while the other secondary mirror can be designed such that it permits substantially identical imaging of one plane in the near field of the light beam. Refinements preferred in this regard are further described hereafter.

In a preferred refinement, the secondary mirrors are arranged at the same or a similar position in the beam path of the light beam such that they can be mutually interchanged.

In this refinement, the at least two secondary mirrors, preferably also more than two secondary mirrors, can, for example, be arranged on a revolving wheel in a common plane, it being possible for the revolving wheel to be rotated by the operator through the housing in which the imaging system is mounted, in order respectively to bring one of the secondary mirrors into the beam path. In this refinement, the secondary mirrors then differ from one another with regard to their curvature, in order to be able to image different planes of the light beam onto the common target site. These secondary mirrors can be plane or convexely curved.

However, it can likewise be preferred for the secondary mirrors to be arranged at different positions in the beam path of the light beam. In this case, the secondary mirrors can permit imaging of different planes of the light beam, for example on the basis of a different spacing from the primary mirror, while the secondary mirrors themselves can, for example, have the same radius of curvature between them.

In a particularly preferred refinement, at least one of the secondary mirrors is arranged at the focal point of the primary mirror.

The advantage of this arrangement consists in that the focal length of the at least one secondary mirror then has no influence on the reproduction scale. The reproduction scale is then determined solely by the selection of the spacing of the primary mirror from the target site. All the secondary mirrors present are preferably arranged at the focal point of the mirror such that they can be mutually interchanged.

In a further, particularly preferred refinement, an optical path length from the primary mirror to the target site is equal to twice the focal length of the primary mirror.

This selection of the spacing of the primary mirror from the target site advantageously results in a reproduction scale of 1:1, independently of the spacing of the plane to be imaged from the primary mirror and from the focal length of the secondary mirror or mirrors. The focal length of the secondary mirror can then preferably be selected in accordance with the equations for paraxial optics in such a way that the object plane to be imaged is imaged sharply onto the image plane of the target site. This advantageously results in an imaging system that automatically always supplies a reproduction scale of 1:1 and in the case of which the desired object plane to be imaged can be varied by selecting the focal length of the secondary mirrors, while the primary mirror advantageously need not be adjusted, and so the outlay on adjustment is not increased.

A few preferred refinements which permit the light beam to be imaged in the near field and/or far field are mentioned below.

Thus, one secondary mirror is preferably designed such that it permits substantially identical imaging of one plane in the near field of the light beam, and the other secondary mirror is designed such that it permits a plane to be imaged in the far field or the light beam to be focused onto the target site.

This refinement constitutes an advantageously very simple design of the imaging system according to the invention with the aid of which at least one plane in the near field and the angular distribution of the light beam (far field) can be imaged onto the target site.

When the light beam need be imaged only at two planes in the near field, the system can preferably be designed in the simplest case such that the at least two secondary mirrors are designed such that they permit substantially identical imaging of two planes spaced apart in the beam direction in the near field of the light beam.

It is thereby possible, for example, for the cross section of the light beam at a spacing of half a meter and, for example, at a spacing of two meters from the input of the light beam into the imaging system to be imaged onto the common target site. These planes correspond, for example, to the front and rear aperture stops of a laser resonator.

In a further preferred refinement, at least three secondary mirrors are present of which at least two are designed such that they permit substantially identical imaging of two planes, spaced apart in the beam direction, in the near field of the light beam, and a further secondary mirror is designed such that it permits a plane to be imaged in the far field or the light beam to be focused onto the target site.

In this refinement, the cross section of the light beam at two sites in the near field and the angular distribution of the light beam in the far field can therefore be imaged onto the common target site.

In a further preferred refinement, a further primary mirror is present, and a beam splitter is arranged in the beam path such that in each case a component beam falls onto the first primary mirror and the second primary mirror, and at least one secondary mirror is assigned to the further primary mirror in such a way that both component beams are imaged onto the target site, preferably in a juxtaposed fashion.

This refinement permits simultaneous imaging at least two planes of the light beam onto the common target site without switching over, for example it is then possible for both planes to be imaged onto the target site, for example detector, in a juxtaposed fashion, it thereby being possible to examine the quality of the light beam in little time.

It is preferred, furthermore, in this case when the further secondary mirror assigned to the further primary mirror is designed such that it permits a plane to be imaged in the far field or the light beam to be focused onto the target site, while the secondary mirrors assigned to the first primary mirror permit imaging at least two planes, spaced apart in the beam direction, in the near field of the light beam.

In this refinement, the near and far fields of the light beam can be imaged simultaneously onto the common target site, as a result of which there is no need to switch over between near and far fields by interchanging the secondary mirrors.

In a further preferred refinement, the beam splitter has a wedge plate, and there is arranged in the beam path of the component beams passed by the beam splitter a further wedge plate whose wedge angle is half as large as that of the wedge plate of the beam splitter.

The use of wedge plates as beam splitters has the advantage in general that reflections occurring on the second interface of the wedge plate are not superimposed on the reflected beam. Since, however, a wedge plate constitutes a dispersive element, the said selection of the wedge angles cancels a splitting, occurring because of dispersion, of the light beam when passing through the beam splitter through a double traverse of the further wedge plate, and so the imaging system according to the invention remains independent of wavelength despite the use of such wedge plates.

In a further preferred refinement, the at least one primary mirror and the at least two secondary mirrors are tilted slightly relative to the respective direction of light incidence.

The tilting of the mirrors featuring in the optical imaging system according to the invention in relation to the respective direction of light incidence permits imaging free from shading. However, in this case the tilt angles are selected to be so small that the imaging quality is not limited owing to aberrations caused by the tilting, and/or the aberrations of the mirrors cancel out mutually. Moreover, the tilt angles of the at least two secondary mirrors are preferably selected such that the at least two secondary mirrors in each case effect centered imaging on the target site.

In a further preferred refinement, the at least one primary mirror and the at least two secondary mirrors have metallic reflecting surfaces.

As already mentioned, with regard to the independence of the imaging from wavelength, it is mirrors with metallic reflecting surfaces that are best suited for the imaging system according to the invention. With the exception of the beam splitter provided in one of the previously mentioned refinements, the passage of light through glass is avoided, as is the passage of the light through dielectric layers.

The imaging system according to the invention therefore preferably uses reflective optical imaging elements and avoids refractive imaging elements such as lenses or the like.

The imaging system according to the invention can be of particularly compact design and is therefore suitable, in particular, to be designed as a portable unit that can be used, for example, in customer services.

According to the invention, a device for analyzing and/or adjusting a light beam, in particular a laser light beam, has an optical imaging system according to one or more of the previously mentioned refinements.

Further advantages and features of the invention emerge from the following description and the attached drawing.

It goes without saying that the abovementioned features and those still to be explained below can be used not only in the combination respectively specified, but also in other combinations or on their own, without departing from the scope of the present invention.

BRIEF DESCRIPTION OF THE DRAWINGS

Exemplary embodiments of the invention are illustrated in the drawing and will be described in more detail hereafter with reference to the latter, in which.

DETAILED DESCRIPTION OF PREFERRED EMBODIMENTS

Figure 1:
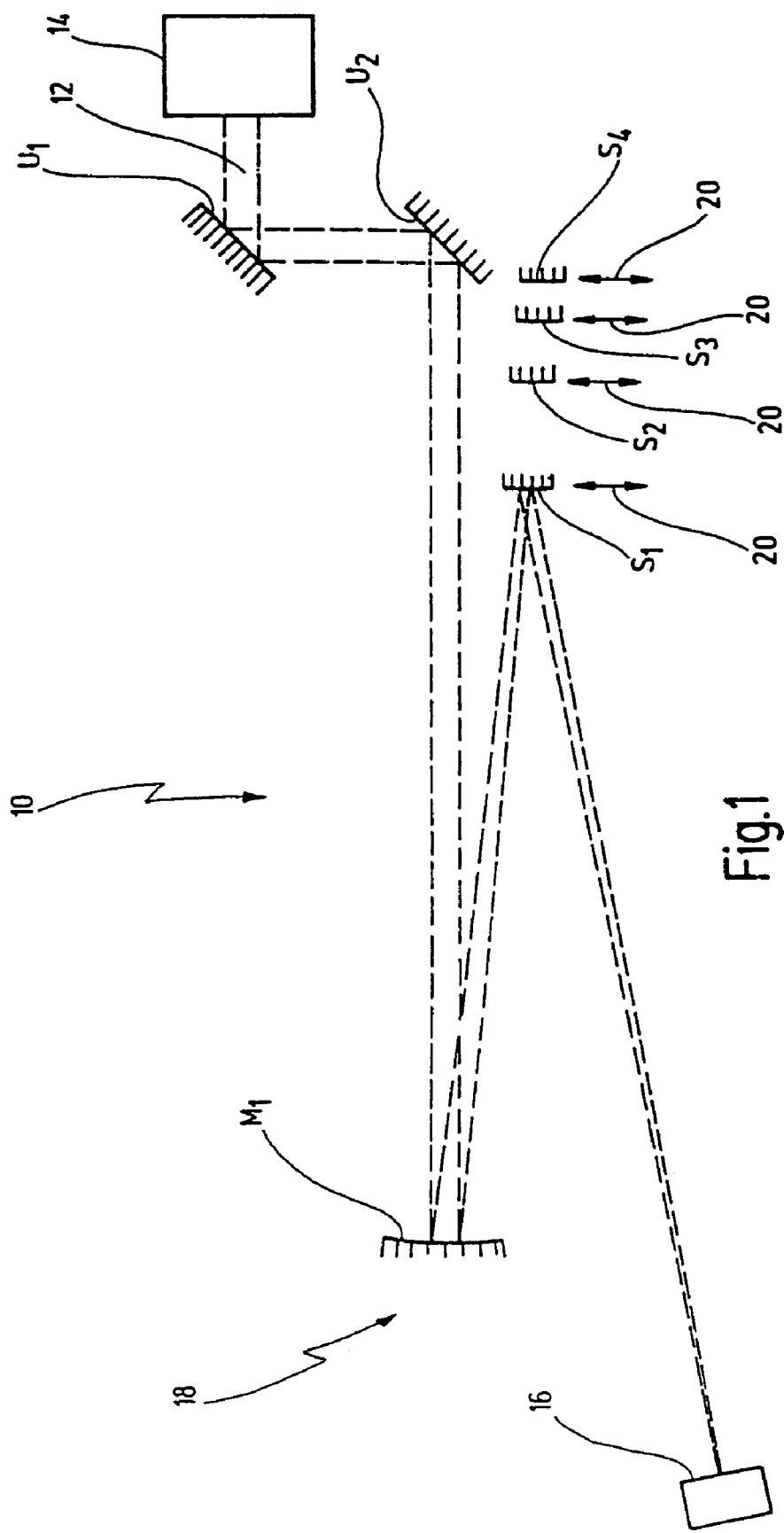
FIG. 1 shows a schematic of an optical imaging system in accordance with a first exemplary embodiment, in a first operating position.
Figure 2:
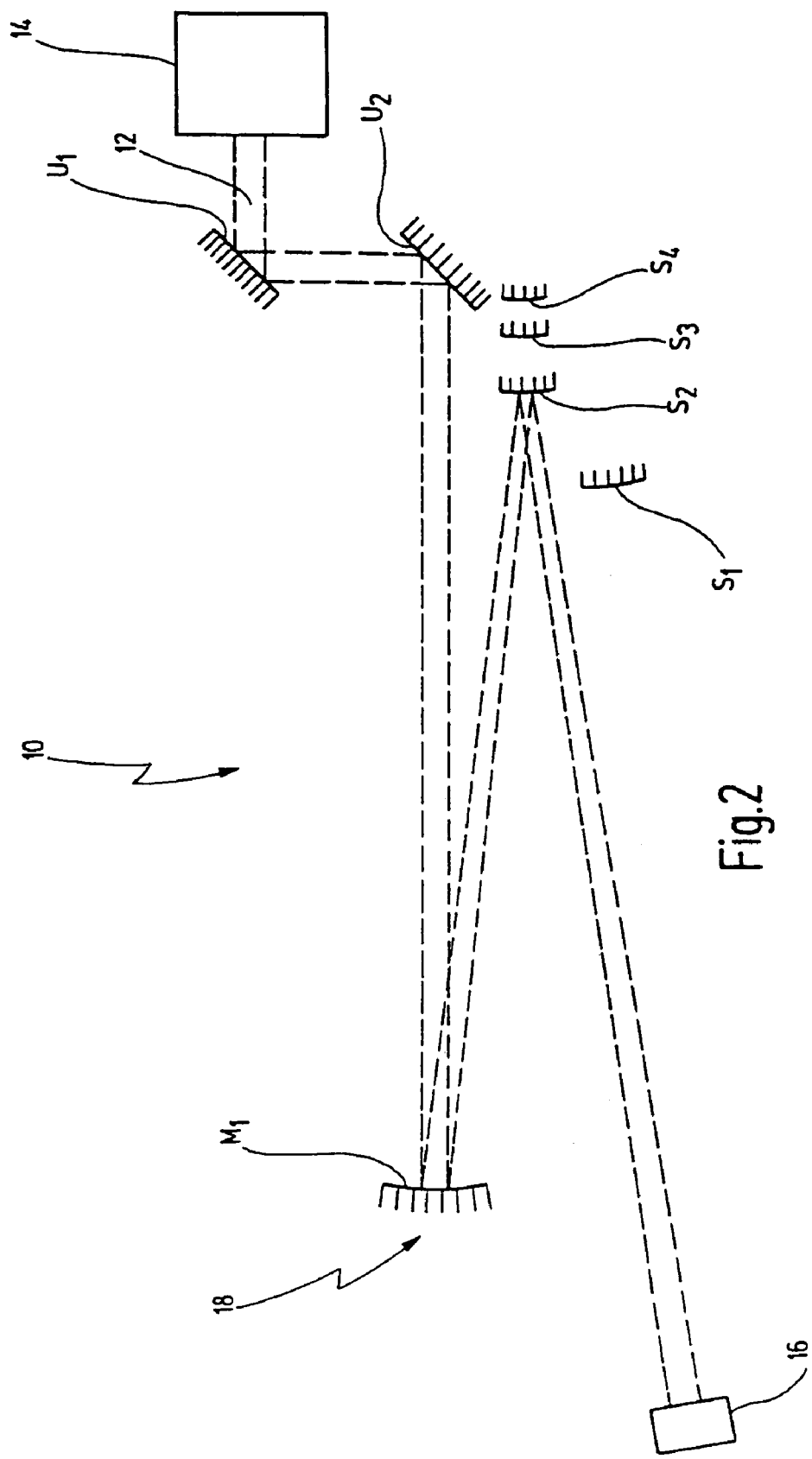
FIG. 2 shows the imaging system in FIG. 1, in a second operating position.

An optical imaging system, provided with the general reference numeral 10, for imaging at least two planes of a light beam 12 spaced apart in the beam direction is illustrated in FIGS. 1 and 2. The light beam 12 is, in particular, a laser light beam that is emitted by a laser 14. The at least two planes of the light beam 12 spaced apart in the beam direction are intended to be imaged onto a common target site 16, here in a detector.

Starting from the laser 14, the light beam 12 is guided into the imaging system 10 via two deflecting mirrors $U_1$ and $U_2$. The deflecting mirrors $U_1$ and $U_2$ can be adjusted for position and angle, in order to permit adjustment of the incident light beam 12.

The imaging system 10 has at least one optically imaging element 18 that is a collecting primary mirror Ml. The primary mirror $M_1$ has a spherically reflecting metallic surface.

Seen in the propagation direction of the light beam, at least two, in the present exemplary embodiment four, secondary mirrors $S_1$, $S_2$, $S_3$ and $S_4$ are arranged downstream of the primary mirror $M_1$.

The secondary mirrors $S_1$-$S_4$ can be brought alternately into the beam path of the light beam 12 or can be moved out of the latter, as indicated schematically by double arrows 20. For this purpose, the secondary mirrors $S_1$-$S_4$ are held movably in the imaging system 10 by means of a mechanism that is not shown in more detail.

While the secondary mirrors $S_1$-$S_4$ in the exemplary embodiment illustrated in FIGS. 1 and 2 are arranged at different positions in the beam path of the light beam 12, that is to say at spaced-apart positions arranged one behind another, it is particularly preferred when the secondary mirrors $S_1$-$S_4$ can be arranged at an identical position in the beam path of the light beam 12 such that they can be mutually interchanged. In the latter case, these secondary mirrors $S_1$-$S_4$ can, however, be arranged on a carrier that is designed as a revolving wheel and can be rotated by hand via an operating device (not illustrated in more detail) at the housing (not illustrated) of the imaging system 10, such that in each case one of the secondary mirrors $S_1$-$S_4$ can be brought into the beam path of the light beam 12.

The secondary mirrors $S_1$-$S_4$ can be plane mirrors, convex mirrors or collecting spherical mirrors.

Both the primary mirror $M_1$ and the secondary mirrors $S_1$-$S_4$ are preferably designed as metallic mirrors or uncoated mirrors, as a result of which the imaging system 10 operates independently of wavelength.

In the exemplary embodiment illustrated in FIGS. 1 and 2, the secondary mirror $S_1$ is designed such that it permits the light beam 12 to be focused with a focal length of 1 m. This corresponds to an imaging of a plane of the light beam 12 in the far field via which the angular distribution of the light beam in the far field is imaged onto the target site 16.

The secondary mirror $S_2$ is designed such that it permits an identical imaging, that is to say a 1:1 imaging of a plane in the near field of the light beam 12, specifically at the spacing of, for example, 0.5 m from the input of the imaging system 10.

The secondary mirror $S_3$ permits a substantially identical imaging of a plane at the spacing of 1 m from the input of the imaging system 10 in the near field of the light beam 12, and the secondary mirror $S_4$ is designed such that it permits a substantially identical imaging of a plane at the spacing of 2 m in the near field of the light beam 12.

The imaging system 10 is illustrated in FIG. 1 in an operating position in which the light beam is directed from the primary mirror $M_1$ onto the secondary mirror $S_1$ and is focused by the latter onto the target site 16. Thus, an analysis of the angular distribution of the light beam 12 in the far field is possible in this operating position.

The imaging system 10 is shown in FIG. 2 in an operating position in which the secondary mirror $S_1$ has been moved out of the beam path of the light beam 12 such that the light beam 12 is reflected by the primary mirror $S_1$ onto the secondary mirror $S_2$ and by the latter onto the target site 16. In this operating position, a substantially identical imaging of a plane of the light beam 12 is performed at the spacing of 0.5 m from the input of the imaging system 10 onto the target site 16, that is to say onto the detector. If the secondary mirror $S_2$ is likewise moved out of the beam path of the light beam 12, the light beam 12 is reflected by the primary mirror $M_1$ onto the secondary mirror $S_3$ and, when the latter has been moved out of the beam path, onto the secondary mirror $S_4$, and reflected again by the latter correspondingly onto the target site 16.

The primary mirror $M_1$ and the secondary mirrors $S_1$-$S_4$ are slightly tilted relative to the respective direction of light incidence of the light beam 12 onto these mirrors. However, the tilt angles are selected in this case such that the imaging quality is not limited owing to aberrations caused by the tilting. The tilt angles of the secondary mirrors $S_1$-$S_4$ are, moreover, selected such that the image is centered in each case on the same point of the target site 16.

The optical data of the imaging system 10 are represented in tabular form in the terms of the code V in an example in Appendix 1. These data yield the imaging properties of the mirrors of the imaging system 10, their tilt angles relative to the respective direction of light incidence onto these mirrors, and the spacings between the individual mirrors.

Figure 3:
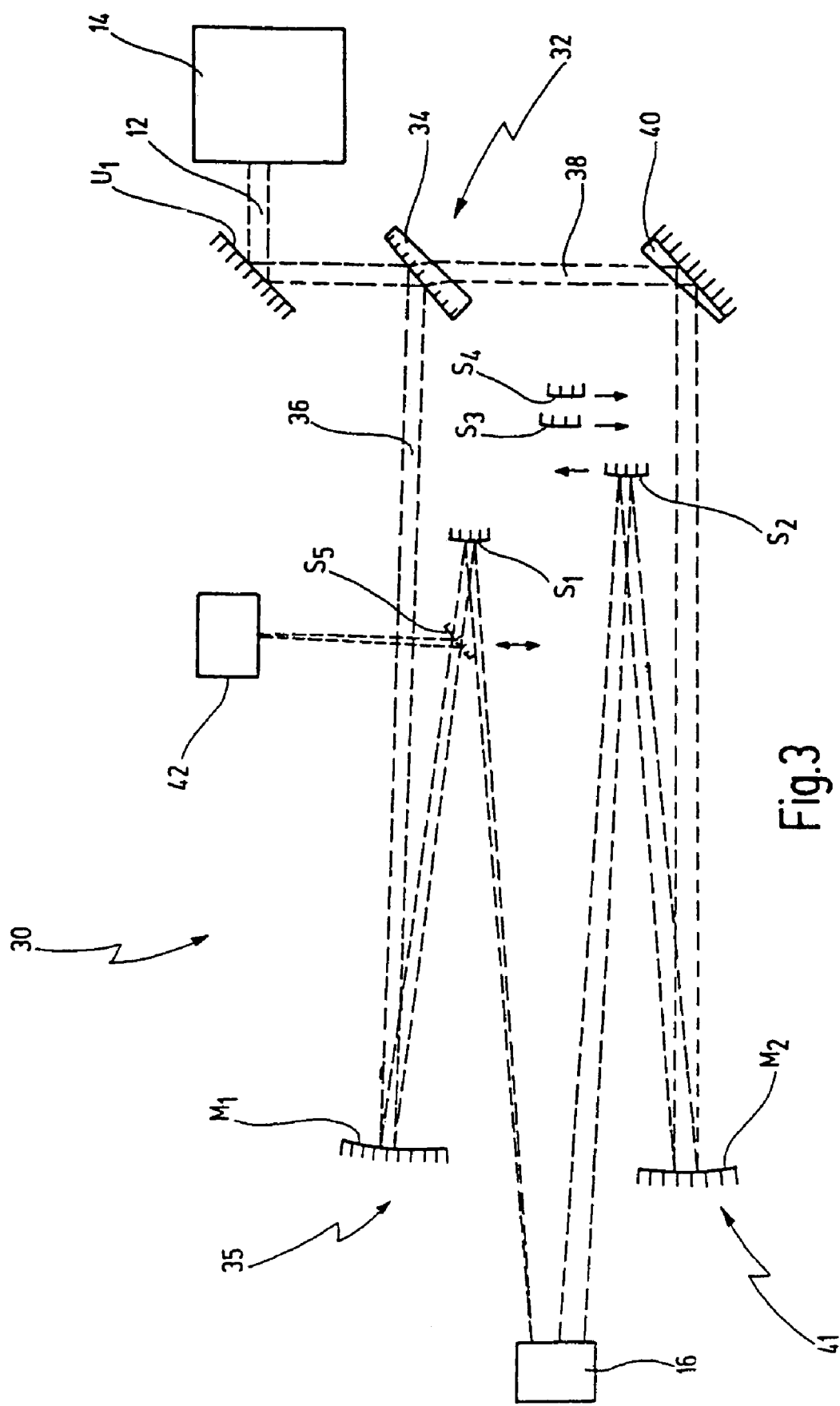
FIG. 3 shows an optical imaging system in accordance with the further exemplary embodiment.

An optical imaging system 30 is illustrated in accordance with a further exemplary embodiment in FIG. 3. Components that are identical to or comparable with the imaging system 10 are provided with the same reference numerals as in the case of the imaging system 10.

Located once again in the beam path of the light beam 12 is a deflecting mirror $U_1$ at the input of the imaging system 30. A beam splitter 32 is arranged downstream of the deflecting mirror $U_1$. The beam splitter 32 has a wedge plate 34. The light beam 12 is split into a first component beam 36 and a second component beam 38 by means of the wedge plate 34. The first component beam 36, which is reflected at the front side of the wedge plate 34, is used for imaging the light beam 12 under far-field conditions.

The second component beam 38 passed by the wedge plate 34 is used for imaging the light beam 12 under near-field conditions.

At least one optically imaging element 35 is arranged in the beam path of the first component beam 36 in the form of a collecting primary mirror $M_1$ downstream of which is arranged a secondary mirror $S_1$ that is designed such that the component beam 36 is focused onto the target site 16.

A second wedge plate 40, whose rear side is reflecting, is arranged in the beam path of the second component beam 38. In this case, the wedge angle of the second wedge plate 40 is half as large as the wedge angle of the first wedge plate 34 such that chromatic tilting of the component beam 38 transmitted through the wedge plate 34 is compensated by reflection of the second component beam 38 at the rear side of the second wedge plate 40 and two-fold passage through the wedge plate 40.

At least one optically imaging element 41 in the form of a collecting primary mirror $M_2$ is arranged in the further course of the beam path of the second component beam 38. Arranged downstream of the primary mirror $M_2$ are three secondary mirrors $S_2$, $S_3$ and $S_4$ which, in turn, are moveable in order that they can be brought into the beam path of the second component beam 38 or removed therefrom. The secondary mirrors $S_2$-$S_4$ are designed as in the case of the imaging system 10 such that they achieve identical imaging onto the target site 16 of planes of the light beam 12 spaced apart in the beam direction.

The first component beam 36 and the second component beam 38 are imaged onto the target site 16 in a juxtaposed fashion. Thus, the near and far fields of the light beam 12 can be imaged simultaneously onto the common target site 16 with the aid of the imaging system 30.

Furthermore, there is arranged in the beam path of the first component beam 36 an additional secondary mirror $S_5$ that is likewise moveable and can optionally be brought into the beam path of the first component beam 36 and taken out thereof again. The further secondary mirror $S_5$ is designed such that it permits the component beam 36 to be focused onto a further target site or further detector 42, for example in order to carry out spectroscopic or energy analysis of the light beam 12.

The optical data of the imaging system 30 are identical to the imaging system 10 in accordance with FIGS. 1 and 2, with the exception of the signs, converted by comparison with the imaging system 10, of the tilt angles of the mirrors $M_2$ and $S_2$-$S_4$.

The imaging system 10 and the imaging system 30 as well are each compact and suitable for a portable configuration.

The imaging system 10 is illustrated schematically for explanatory purposes in an optical diagram.

Figure 4:
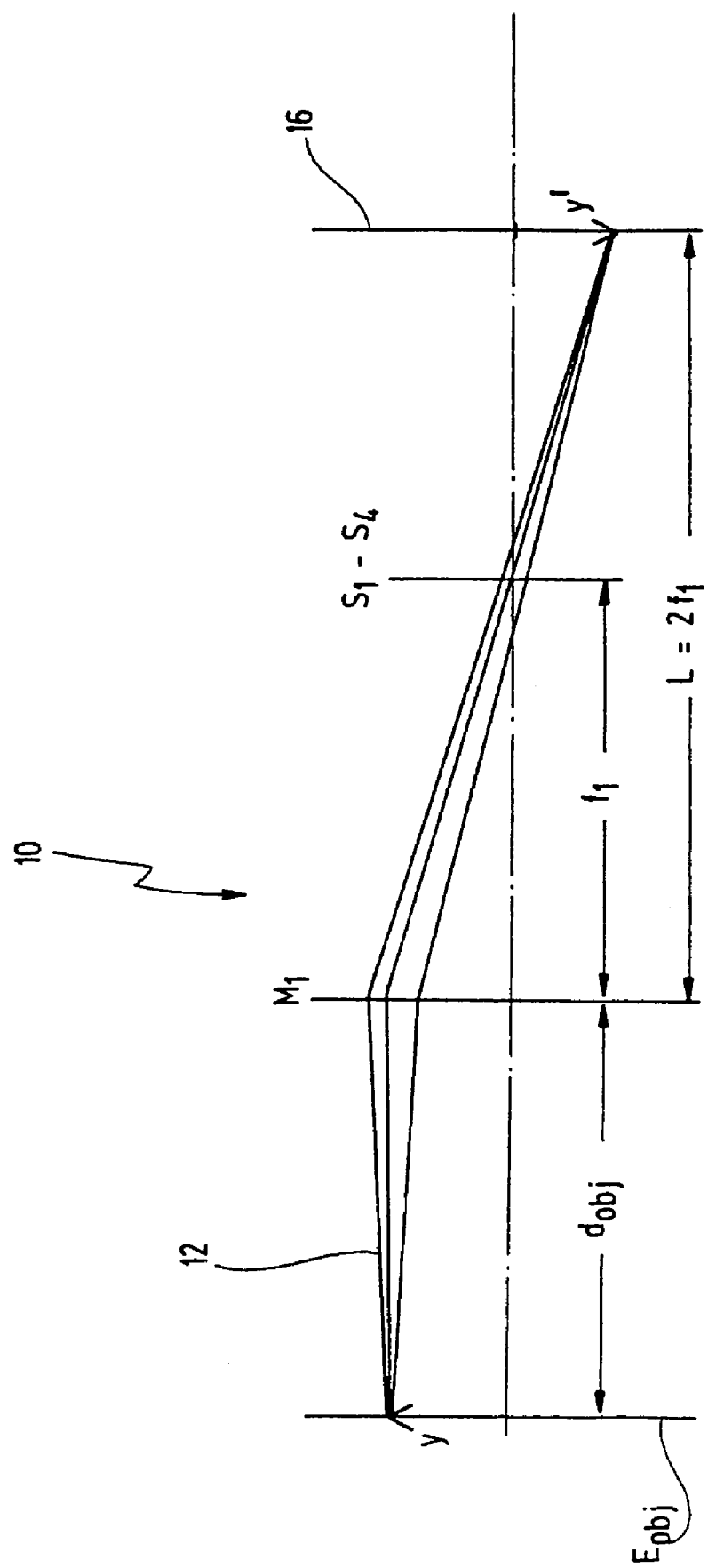
FIG. 4 shows a sketch of the principle for the purpose of explaining the mode of operation of the imaging system in FIG. 1.

A particularly preferred embodiment of the imaging system 10 in FIG. 1 (and likewise of the imaging system 30 in FIG. 3) provides that the secondary mirrors $S_1$-$S_4$ are all arranged at the focal point of the primary mirror $M_1$, which has the focal length $f_1$ in accordance with FIG. 4.

In this case, the focal length of the secondary mirrors $S_1$, $S_2$, $S_3$, $S_4$, that is to say of the secondary mirror $S_1$, $S_2$, $S_3$ or $S_4$ currently positioned in the light path has no influence on the reproduction scale for a light beam incident in a parallel fashion on the primary mirror $M_1$ (telecentric input, which is typical for laser beams). The reproduction scale is determined solely by the selection of the optical path length L from the primary mirror $M_1$ to the target site 16.

If the optical path length L from the primary mirror $M_1$ to the target site 16 is selected to be equal to twice the focal length $f_1$ of the primary mirror $M_1$, the result is a reproduction scale of 1:1 independently of the space $d_{OBJ}$ of the object y to be imaged from the primary mirror $M_1$, and independently of the focal length of the secondary mirror $S_1$, $S_2$, $S_3$ or $S_4$. It is shown in FIG. 4 that the image y' is of the same size as the object y. The object plane $E_{OBJ}$ is thereby imaged 1:1 onto the target site 16. In order, now, for object planes $E_{OBJ}$ mutually spaced apart to be sharply imaged onto the target site 16 at the scale of 1:1 without changing the position of the primary mirror $M_1$, the focal length of the secondary mirrors $S_1$, $S_2$, $S_3$ and $S_4$ can be selected as appropriate in accordance with the equations for paraxial optics, that is to say each plane $E_{OBJ}$ to be imaged is then assigned a specific secondary mirror $S_1$, $S_2$, $S_3$ or $S_4$ that has the focal length $f_2$, where $$\frac{1}{f_2} = \frac{1}{f_1} - \frac{1}{\left(f_1 - \frac{f_1 d_{OBJ}}{d_{OBJ} - f_1}\right)}$$

Consequently, the desired object plane $E_{OBJ}$ can be imaged onto the target site 16 at the desired spacing from the primary mirror $M_1$ by mutually interchanging the secondary mirrors $S_1$, $S_2$, $S_3$ or $S_4$. In other words, the spacing of the object plane $E_{OBJ}$ to be imaged is varied by selecting the focal length $f_2$ of the secondary mirror $S_1$, $S_2$, $S_3$ or $S_4$ placed into the beam path.

Whereas it was previously described that the secondary mirrors $S_1$-$S_4$ are arranged exactly at the focal point of the primary mirror $M_1$, the secondary mirrors $S_1$-$S_4$ can also be seated slightly outside the focal point of the primary mirror $M_1$, in order, for example, to avoid high radiation loads owing to the sharp focusing of the light onto the secondary mirrors $S_1$-$S_4$.

In conjunction with the target site or detector 16 and the possible further detector 42, the imaging system 10 or 30 forms a device for analyzing and/or adjusting the light beam 12 and/or for adjustment in the laser resonator that generates the light beam 12.

CodeV - FABRICATION DATA
Variable reflective imaging system

| ELEMENT NUMBER | RADIUS OF CURVATURE FRONT | RADIUS OF CURVATURE BACK | THICKNESS | APERTURE DIAMETER FRONT | APERTURE DIAMETER BACK | GLASS |
|---|---|---|---|---|---|---|
| OBJECT | INF*4 | | INFINITY*1 | 20.0000 | | |
| | | | 0.0000 | | | |
| 1 | DECENTER(1) | | −50.0000 | 30.0000 | | REFL |
| | INF | | | | | |
| 2 | DECENTER(2) | | 250.0000 | 30.0000 | | REFL |
| | INF | | 0.0000 | 30.0000 | | |
| 3 | DECENTER(3) | | 0.0000 | 30.0000 | | REFL |
| | −500.0000 CC | | −191.9009*3 | | | |
| 4 | DECENTER(4)*5 | | 0.0000 | 10.0000 | | REFL |
| | −150.0000*2 | | | | | |
| | DECENTER(5) | | | 20.1674 | | |
| IMAGE | IMAGE DISTANCE = INF | | 0.0000 | 20.1674 | | |

NOTES
Positive radius indicates the center of curvature is to the right
Negative radius indicates the center of curvature is to the left
Dimensions are given in millimeters
Thickness is axial distance to next surface
Image diameter shown above is a paraxial value, it is not a ray traced value

| | DECENTERING CONSTANTS | | | | | |
|---|---|---|---|---|---|---|
| DECENTER | X | Y | Z | ALPHA | BETA | GAMMA |
| D(1) (BEND) | 0.0000 | 0.0000 | 0.0000 | 0.0000 | −45.0000 | 0.0000 |
| D(2) (BEND) | 0.0000 | 0.0000 | 0.0000 | 45.0000 | 0.0000 | 0.0000 |
| D(3) (BEND) | 0.0000 | 0.0000 | 0.0000 | −3.0000 | 0.0000 | 0.0000 |
| D(4) (BEND) | 0.0000 | 0.0000 | 0.0000 | 8.3773*5 | 0.0000 | 0.0000 |
| D(5) (GLB S4) | 0.0000 | 67.6707 | 59.8167 | 9.0000 | 0.0000 | 0.0000 |

A decenter defines a new coordinate system (displaced and/or rotated) in which subsequent surfaces are defined. Surfaces following a decenter are aligned on the local mechanical axis (z-axis) of the new coordinate system. The new mechanical axis remains in use until changed by another decenter. The order in which displacements and tilts are applied on a given surface is specified using different decenter types and these generate different new coordinate systems; those used here are explained below. Alpha, beta, and gamma are in degrees.

| | DECENTERING CONSTANT KEY: | |
|---|---|---|
| TYPE | TRAILING CODE | ORDER OF APPLICATION |
| DECENTER | | DISPLACE (X, Y, Z) TILT (ALPHA, BETA, GAMMA) REFRACT AT SURFACE THICKNESS TO NEXT SURFACE |
| DECENTER & BEND | BEND | DECENTER (X, Y, Z, ALPHA, BETA, GAMMA) REFLECT AT SURFACE BEND (ALPHA, BETA, GAMMA) THICKNESS TO NEXT SURFACE |
| GLOBAL DECENTER | GLB Sj | DECENTER (X, Y, Z, ALPHA, BETA, GAMMA) WITH RESPECT TO GLOBAL SURFACE REFRACT AT SURFACE THICKNESS TO NEXT SURFACE |

| REFERENCE WAVELENGTH = 157.0 NM | | | | |
|---|---|---|---|---|
| *ZOOM PARAMETERS | POS. 1 | POS. 2 | POS. 3 | POS. 4 |
| *1 = | INF | 1700.0000 | 700.0000 | 200.0000 |
| *2 = | −150.0000 | −100.0000 | −300.0000 | INF |
| *3 = | −191.9009 | −242.8636 | −233.3418 | −218.9504 |
| *4 = | 0.0000 | 0.0000 | 0.0000 | 0.0000 |
| *5 = | 8.3773 | 6.9937 | 7.2172 | 7.5827 |

This is a decentered system. If elements with power are decentered or tilted, the first order properties are probably inadequate in describing the system characteristics.

| INFINITE CONJUGATES | POS. 1 | | |
|---|---|---|---|
| EFL = | 1109.4064 | | |
| BFL = | 2.6739 | | |
| FFL = | −3648.0212 | | |
| F/NO = | 50.0000 | | |
| AT USED CONJUGATES | POS. 2 | POS. 3 | POS. 4 |
| REDUCTION = | 0.9991 | 0.9998 | 1.0000 |
| FINITE F/NO = | 250.0000 | 250.0000 | 250.0000 |
| OBJECT DIST = | 0.170E+04 | 0.700E+03 | 0.200E+03 |

What is claimed is:

1. An optical imaging system for imaging at least two planes of a light beam spaced apart in the beam direction onto a common target site, comprising:
    at least one optically imaging element arranged in the beam path of said light beam;
    said at least one optically imaging element being a collecting primary mirror having a reflecting surface with a defined reflecting surface area;
    at least two secondary mirrors being arranged downstream of said primary mirror, said at least two secondary mirrors being movable alternately into the beam path of said light beam so as to alternately receive the light beam reflected off the same sized area of the same said reflecting surface of said collecting primary mirror;
    wherein said secondary mirrors are designed such that one of said at least two secondary mirrors permits imaging of one of said at least two planes of said light beam, and the other of said at least two secondary mirrors permits imaging of the other of said at least two planes of said light beam, onto said target site, respectively; and
    further wherein the combination of said one secondary mirror with said primary mirror has a different imaging characteristic with respect to magnification or focal length than the combination of said other secondary mirror with said primary mirror.

2. The imaging system of claim 1, wherein said at least two secondary mirrors are arranged at the same or a similar position in the beam path of said light beam such that they can be mutually interchanged.

3. The imaging system of claim 1, wherein said at least two secondary mirrors are arranged at different positions in the beam path of said light beam.

4. The imaging system of claim 1, wherein at least one of said at least two secondary mirrors is arranged at the focal point of said primary mirror.

5. The imaging system of claim 1, wherein one of said at least two secondary mirrors is designed such that it permits substantially identical imaging of one of said at least two planes in the near field of said light beam, and the other of said at least two secondary mirrors is designed such that it permits a plane of said at least two planes to be imaged in the far field or said light beam to be focused onto said target site.

6. The imaging system of claim 1, wherein said at least two secondary mirrors are designed such that they permit substantially identical imaging of at least two planes spaced apart in the beam direction in the near field of said light beam.

7. The imaging system of claim 1, wherein at least three secondary mirrors are present of which at least two are designed such that they permit substantially identical imaging of at least two planes, spaced apart in the beam direction, in the near field of said light beam, and a further secondary mirror is designed such that it permits a plane to be imaged in the far field or said light beam to be focused onto said target site.

8. The imaging system of claim 1, wherein a second primary mirror is present, a beam splitter is arranged in the beam path such that in each case a component beam falls onto said first primary mirror and said second primary mirror, and wherein at least one secondary mirror is assigned to said second primary mirror in such a way that both component beams are imaged onto said target site.

9. The imaging system of claim 8, wherein said secondary mirror assigned to said primary mirror is designed such that it permits a plane to be imaged in the far field or said light beam to be focused onto said target site, while said secondary mirrors assigned to said first primary mirror permit imaging at least two planes, spaced apart in the beam direction, in the near field of said light beam.

10. The imaging system of claim 1, wherein a second primary mirror is present, a beam splitter is arranged in the beam path such that in each case a component beam falls onto said first primary mirror and said second primary mirror, and wherein at least one secondary mirror is assigned to said second primary mirror in such a way that both component beams are imaged onto said target site, and wherein said beam splitter has a wedge plate, and there is arranged in the beam path of the component beams passed by said beam splitter a further wedge plate whose wedge angle is half as large as that of said wedge plate of said beam splitter.

11. The imaging system of claim 1, wherein said at least one primary mirror and said at least two secondary mirrors are tilted slightly relative to the respective direction of light incidence.

12. The imaging system of claim 1, wherein said at least one primary mirror and said at least two secondary mirrors have metallic reflecting surfaces.

13. The imaging system of claim 1, wherein said at least two secondary mirrors have substantially equal wavelength sensitivity characteristics.

14. The imaging system of claim 1, wherein said target site comprises a detector.

15. The imaging system of claim 14, wherein each of said secondary mirrors images a respective plane of said light beam directly onto said detector.

16. An optical imaging system for imaging at least two planes of a light beam spaced apart in the beam direction onto a common target site, comprising:
- at least one optically imaging element arranged in the beam path of said light beam;
- said at least one optically imaging element being a collecting primary mirror;
- at least two secondary mirrors being arranged downstream of said primary mirror, said at least two secondary mirrors can be brought alternately into the beam path of said beam; and
- wherein said secondary mirrors are designed such that one of said at least two secondary mirrors permits imaging of one of said at least two planes of said light beam, and the other of said at least two secondary mirrors permits imaging of the other of said at least two planes of said light beam onto said target site, respectively;
- and further wherein an optical path length from said primary mirror to said target site is equal to twice the focal length of said primary mirror.

17. A device for at lease one of analyzing a light beam, adjusting a light beam and adjusting a laser resonator, comprising an optical imaging system for imaging at least two planes of a light beam spaced apart in the beam direction onto a common target site, comprising:
- at least one optically imaging element arranged in the beam path of said light beam;
- said at least one optically imaging element being a collecting primary mirror having a reflecting surface with a defined reflectinci surface area;
- at least two secondary mirrors being arranged downstream of said primary mirror, said at least two secondary mirrors being movable alternately into the beam path of said light beam so as to alternately receive the light beam reflected off the same size area of the same said reflecting surface of said collecting primary mirror;
- wherein said secondary mirrors are designed such that one of said at least two secondary mirrors permits imaging of one of said at least two planes of said light beam, and the other of said at least two secondary mirrors permits imaging of the other of said at least two planes of said light beam onto said target site, respectively; and
- further wherein the combination of said one secondary mirror with said primary mirror has a different imaging characteristic with respect to magnification or focal length than the combination of said other secondary mirror with said primary mirror.

18. The device of claim 17, wherein said at least two secondary mirrors have substantially equal wavelength sensitivity characteristics.

19. The device of claim 14, wherein said target site comprises a detector.

20. The device of claim 19, wherein each of said secondary mirrors images a respective plane of said light beam directly onto said detector.

21. An optical imaging system for imaging at least two planes of a light beam spaced apart in the beam direction onto a common target site, comprising:
- at least one optically imaging element arranged in the beam path of said light beam;
- said at least one optically imaging element being a collecting primary mirror;
- at least two secondary mirrors being arranged downstream of said primary mirror, said at least two secondary mirrors being movable alternately into the beam path of said beam;
- wherein said secondary mirrors are designed such that one of said at least two secondary mirrors permits imaging of one of said at least two planes of said light beam, and the other of said at least two secondary mirrors permits imaging of the other of said at least two planes of said light beam, onto said target site, respectively;
- further wherein the combination of said one secondary mirror with said primary mirror has a different imaging characteristic with respect to magnification or focal length than the combination of said other secondary mirror with said primary mirror; and
- further wherein said target site comprises a detector, and each of said secondary mirrors images a respective plane of said light beam directly onto said detector.

22. A device for at least one of analyzing a light beam, adjusting a light beam and adjusting a laser resonator, comprising an optical imaging system for imaging at least two planes of a light beam spaced apart in the beam direction onto a common target site, comprising:
- at least one optically imaging element arranged in the beam path of said light beam;
- said at least one optically imaging element being a collecting primary mirror;
- at least two secondary mirrors being arranged downstream of said primary mirror, said at least two secondary mirrors being movable alternately into the beam path of said beam;
- wherein said secondary mirrors are designed such that one of said at least two secondary mirrors permits imaging of one of said at least two planes of said light beam, and the other of said at least two secondary mirrors permits imaging of the other of said at least two planes of said light beam onto said target site, respectively;
- further wherein the combination of said one secondary mirror with said primary mirror has a different imaging characteristic with respect to magnification or focal length than the combination of said other secondary mirror with said primary mirror; and
- further wherein said target site comprises a detector, and each of said secondary mirrors images a respective plane of said light beam directly onto said detector.

* * * * *

UNITED STATES PATENT AND TRADEMARK OFFICE
CERTIFICATE OF CORRECTION

PATENT NO. : 7,477,438 B2
APPLICATION NO. : 10/441990
DATED : January 13, 2009
INVENTOR(S) : Alois Herkommer It is certified that error appears in the above-identified patent and that said Letters Patent is hereby corrected as shown below:

Column 12,
Line 38, after "said" insert --second--.

Column 13,
Line 13, after "said" insert --light--.
Line 24, "lease" should be --least--.
Line 34, "reflectinci" should be --reflecting--.
Line 39, "size" should be --sized--.
Line 55, "claim 14" should be --claim 17--.

Column 14,
Line 13, after "said" insert --light--.
Line 40, after "said" insert --light--.

Signed and Sealed this

Twenty-first Day of April, 2009

JOHN DOLL
*Acting Director of the United States Patent and Trademark Office*